Figure 5:
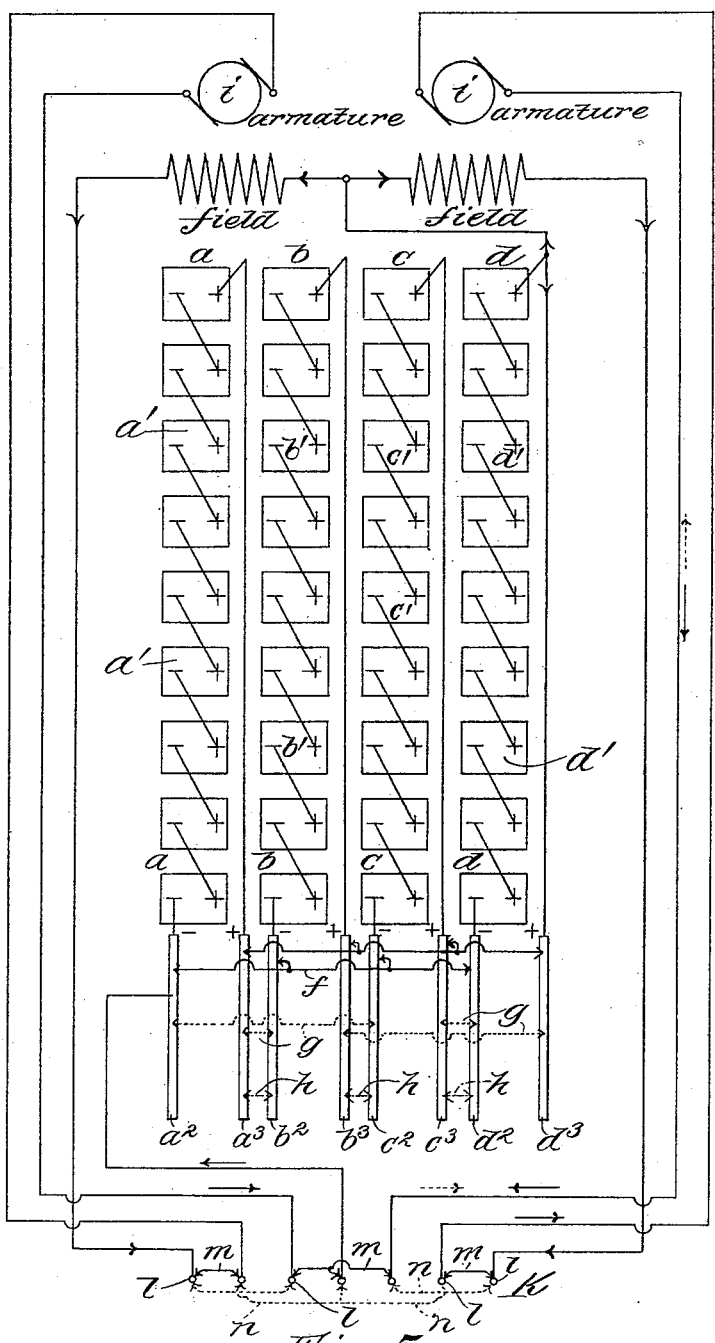

No. 620,628. Patented Mar. 7, 1899.
C. E. WOODS.
APPARATUS FOR CONTROLLING OPERATION OF MOTORS.
(Application filed Feb. 12, 1898.)
(No Model.) 2 Sheets—Sheet 1.
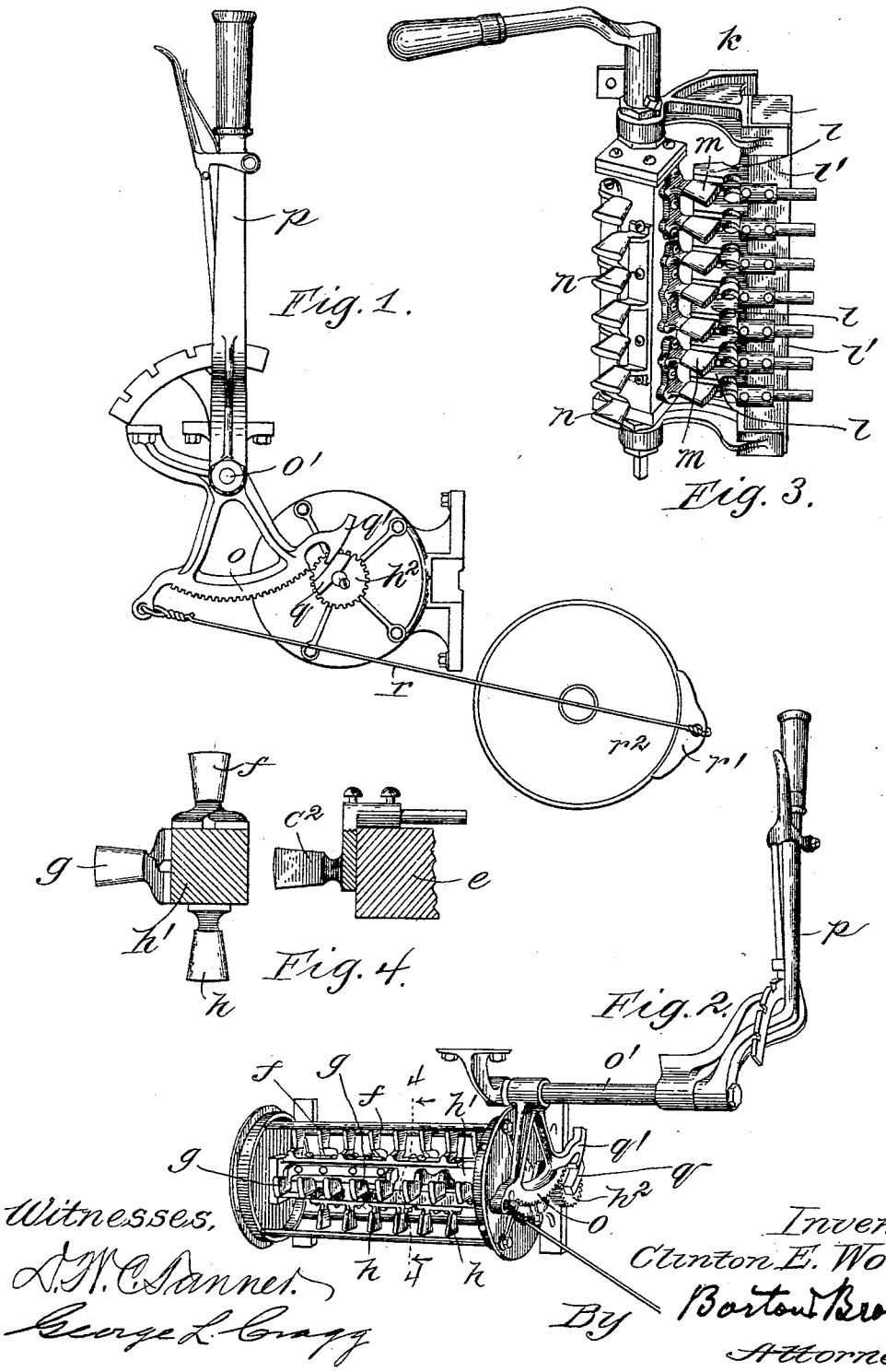

No. 620,628. Patented Mar. 7, 1899.
C. E. WOODS.
APPARATUS FOR CONTROLLING OPERATION OF MOTORS.
(Application filed Feb. 12, 1898.)

(No Model.) 2 Sheets—Sheet 2.

Witnesses:—

Inventor,
Clinton E. Woods,
By Barton & Brown,
Attorneys.

UNITED STATES PATENT OFFICE.

CLINTON E. WOODS, OF CHICAGO, ILLINOIS, ASSIGNOR TO THE FISCHER EQUIPMENT COMPANY, OF SAME PLACE.

APPARATUS FOR CONTROLLING OPERATION OF MOTORS.

SPECIFICATION forming part of Letters Patent No. 620,628, dated March 7, 1899.

Application filed February 12, 1898. Serial No. 670,021. (No model.)

*To all whom it may concern:*

Be it known that I, CLINTON E. WOODS, a citizen of the United States, residing at Chicago, in the county of Cook and State of Illinois, have invented a certain new and useful Improvement in Apparatus for Controlling the Operation of Motors, (Case No. 4,) of which the following is a full, clear, concise, and exact description.

My invention relates to apparatus for controlling the operation of electric motors; and it consists in an improved combined controller and braking apparatus whereby the passage of effective current to the motor is prevented while the brake is applied and the application of the brake prevented while current is passing through the motor.

The preferred embodiment of the invention may be generally described as consisting in the combination, with a controller for varying the condition of a circuit including the motor, of a brake for engaging and checking the motion of a portion driven by said motor, actuating mechanism for actuating the brake and controller, said controller being adapted to open or render ineffective the circuit through said motor, said operating mechanism being adapted after having actuated the controller to open or render ineffective the circuit through said motor to disengage itself from the controller and in its further operation to apply the brake, means being preferably provided for locking the controller in the position it occupies when the motor-circuit is open or rendered ineffective.

I will further define the nature of my invention in the claims and by reference to the accompanying drawings.

In the drawings, Figure 1 is a side elevation of my combined controller and brake apparatus. Fig. 2 is a perspective front view of the apparatus shown in Fig. 1. Fig. 3 is a perspective view of a reversing-switch. Fig. 4 is a cross-sectional view on line 4 4 of Fig. 2. Fig. 5 is a diagrammatic view showing the association of the apparatus of my invention with working circuits.

Like parts are referred to by similar letters of reference throughout the different figures.

I will first describe the circuits and instrumentalities for controlling the application of current to the motor or motors by reference to all the views. In this particular instance I have shown in Fig. 5 four generators $a$ $b$ $c$ $d$, made up of storage batteries $a'$ $a'$ $b'$ $b'$ $c'$ $c'$ $d'$ $d'$, respectively. Said generators have their terminals $a^2$ $a^3$, $b^2$ $b^3$, $c^2$ $c^3$, and $d^2$ $d^3$ mounted, preferably, upon an insulating-support $e$, which is preferably stationary. Said generator terminals or contacts are each preferably formed with two jaws or clips constructed in one body or casting, the contacts of the movable element of the controller being engaged between the said jaws. The conductors leading from the generators to the terminals are preferably inserted in sockets extending from the terminals. The sets $f$, $g$, and $h$ of controller-contacts are mounted upon the insulating-support $h'$, which in this instance is of square cross-section and preferably revoluble, each set being mounted upon a face of the support. The contacts $f$, $g$, and $h$ are preferably in the form of blades which are adapted for insertion between corresponding jaws of the generator-terminals. Certain of the controller-contacts of each set are electrically connected. I preferably form the electrically-connected contacts in a single body, preferably an integral casting. The contact-jaws are constructed to have a spring-like engagement with the contact-blades.

Referring to Fig. 5, the contacts $f$, $g$, and $h$ are adapted to connect the generators in circuit with the motors $i$ $i$, the motors being connected by said sets of contacts with said batteries respectively in parallel, series parallel, and in series to vary the torque and speed as required. Full lines are connected with the generator-terminals to show the grouping of the generators effected by the set of contacts $f$, dotted lines are employed to show the grouping effected by the set of contacts $g$, and dot-and-dash lines are employed to show the grouping effected by the set of contacts $h$. In this particular instance I have shown two motors which I preferably employ in operating vehicles. The pole-changing switch $k$ is employed to vary the direction of current through one of the elements of each motor—in this instance, the armature—to control the direction of movement of the motors or bodies driven thereby. The motor-terminals $l\, l$ are preferably mounted upon an insulating-base $l'$, said terminals or contacts being preferably similar in construction to the generator-terminals. The reversing-switch $k$ is in this instance provided with two sets of contacts $m\, n$, which are preferably mounted upon a rotatable element of square cross-section, each of the latter contacts being preferably of construction similar to that of the contacts upon the movable element of the grouping-switch. In one position the contacts or blades of the set $m$ serve, by their engagement with the jaws of the motor-terminals, to pass current through the armatures in the direction indicated by the arrows drawn in full lines. For example, the contact-blades of the set $n$ serve to reverse the current through the armatures. The connections that are established by the contacts of set $m$ between the motor contacts or terminals are indicated in full lines. The connections established by the contacts of set $n$ are indicated by dotted lines.

Referring now particularly to Figs. 1, 2, and 4, I will describe one form of my improved apparatus for governing the relative operations of the controller and brake. This feature of the invention is illustrared in connection with the particular form of controller herein shown, but it may be also used in connection with other forms of controllers. I mount the pinion $h^2$ upon the revoluble element $h'$ of the controller and rotate said controller element by means of said pinion and a segmental actuating-gear $o$, which is adapted to rotate the contact-blades of the controller in one direction or the other. The actuating-gear is preferably operated by a lever $p$, which, by the familiar mechanism illustrated, may be maintained in either of three positions, corresponding to the different positions of the controller.

The pinion $h^2$ and the segmental gear $o$ constitute a form of multiplying-gear whereby a given angular velocity of the lever $p$ about its axis is accompanied by a greater velocity of the pinion $h^2$ and the controller actuated thereby. I thus am enabled to employ a lever which is adapted to operate the mechanism for controlling the current and applying the brake, the lever requiring by this construction only a short range.

The rotatable element and the lever mechanism for operating the same may be said to constitute the controller for adjusting the condition of the motor-circuit.

In the position of the parts illustrated no current is flowing, the movable and stationary contacts of the controller being out of engagement. As this condition of the apparatus is brought about the pinion has been rotated to a position to bring a cam or lug $q$ into position to be engaged by a shoe $q'$, the cam in being brought into this position by the controller permitting the further operation of the lever, while at the same time the revoluble element of the controller is locked to prevent accidental inclusion of the motors in circuit with the generators.

The brake-cable $r$ is attached to an extension of the actuating-gear and through the medium of the gear and the shaft $o'$ thereof with the lever $p$. The engagement of the shoe and cam is of sufficient duration to permit the brake-cable to have the required range of movement. The brake-cable is adapted to engage a brake-shoe $r'$ with a rotating portion driven by a motor, as the wheel $r^2$. Other means than those herein shown and particularly described may be employed for locking the controller in position during the operation of the brake, and the precise means shown for preventing the passage of effective current through the motor during the application of the brake may be modified.

While I have herein shown and particularly described the preferred embodiment of my invention and a particular use thereof, it is obvious that changes may be readily made and the apparatus employed in other connections without departing from the spirit of the invention. I have omitted the enumeration of details and many modifications that may be made, since to particularly specify the same would obscure rather than make clear the more essential features.

Having, however, specified the preferred embodiment of the invention, I claim as new, and desire to secure by Letters Patent, together with the limitations expressed or by law implied, the following:

1. The combination with a controller for varying the condition of a circuit including a motor, of a brake for engaging and checking the motion of a portion driven by said motor, operating mechanism for actuating the brake and controller, said controller being adapted to open or render ineffective the circuit through said motor, said operating mechanism being adapted, after having actuated the controller to open or render ineffective the circuit through said motor, to disengage itself from the controller and in its further operation, to apply the brake, and means for locking the controller in the position it occupies when the motor-circuit is opened or rendered ineffective thereby, substantially as described.

2. The combination with a rotating member of a controller, of a pinion mounted thereon, an operating-lever, an actuating-gear connected therewith and adapted through a portion of its range of movement to actuate said member to effect the required changes in circuit conditions, and braking mechanism also operated by said lever, said actuating-gear during the remainder of its movement being adapted to be operatively disengaged from said pinion, the operating-lever in moving the actuating-gear through the remainder of its range being adapted to operate the braking mechanism, substantially as described.

3. The combination with a rotating member of a controller, of a pinion mounted thereon, an operating-lever, an actuating-gear connected therewith and adapted through a portion of its range of movement to actuate said member to effect the required changes in circuit conditions, braking mechanism also operated by said lever, said actuating-gear during the remainder of its movement being adapted to be operatively disengaged from said pinion, the operating-lever in moving the actuating-gear through the remainder of its range being adapted to operate the braking mechanism, a lug fixedly mounted with relation to the rotatable member, and a shoe fixedly mounted with relation to the actuating-gear adapted to engage the lug during the operation of the mechanism, substantially as described.

4. The combination with the pivotally-mounted swinging lever $p$, of the segmental gear portion $o$ operated by the lever, a pinion or gear portion $h^2$ operatively connected with the controller of a motor and rotated by the gear $o$ as the latter is moved through a portion of its range of movement and a brake adapted to engage a motor-driven portion also operated by said lever upon its continued movement, substantially as described.

5. The combination with the pivotally-mounted swinging lever $p$, of the segmental gear portion $o$ carried by the lever, a pinion $h^2$ for operating a motor-controller, said pinion and gear having separable engagement, and a brake cable or chain $r$ connected between the lever and a brake, the said pinion and gear portion being separated upon the application of the brake, substantially as described.

6. The combination with a swinging lever $p$, of a motor-controller, a multiplying-gear, all of whose members are rotatable, interposed between said controller and lever for increasing the speed of the controller relative to the speed of the actuating-lever, and a brake adapted to engage a motor-driven portion also operated by said actuating-lever, substantially as described.

7. The combination with a swinging lever $p$, of a motor-controller, a multiplying-gear, all of whose members are rotatable, interposed between said controller and lever for increasing the speed of the controller relative to the speed of the actuating-lever, and a brake adapted to engage a motor-driven portion also operated by said lever, said lever serving to adjust the multiplying-gear to relieve the controller of the actuating influence thereof, when the lever has been shifted through a predetermined range of movement, the lever in its continued movement serving to apply the brake, substantially as described.

In witness whereof I hereunto subscribe my name this 10th day of February, A. D. 1898.

CLINTON E. WOODS.

Witnesses:
GEORGE L. CRAGG,
LYNN LAWRENCE.